UNITED STATES PATENT OFFICE.

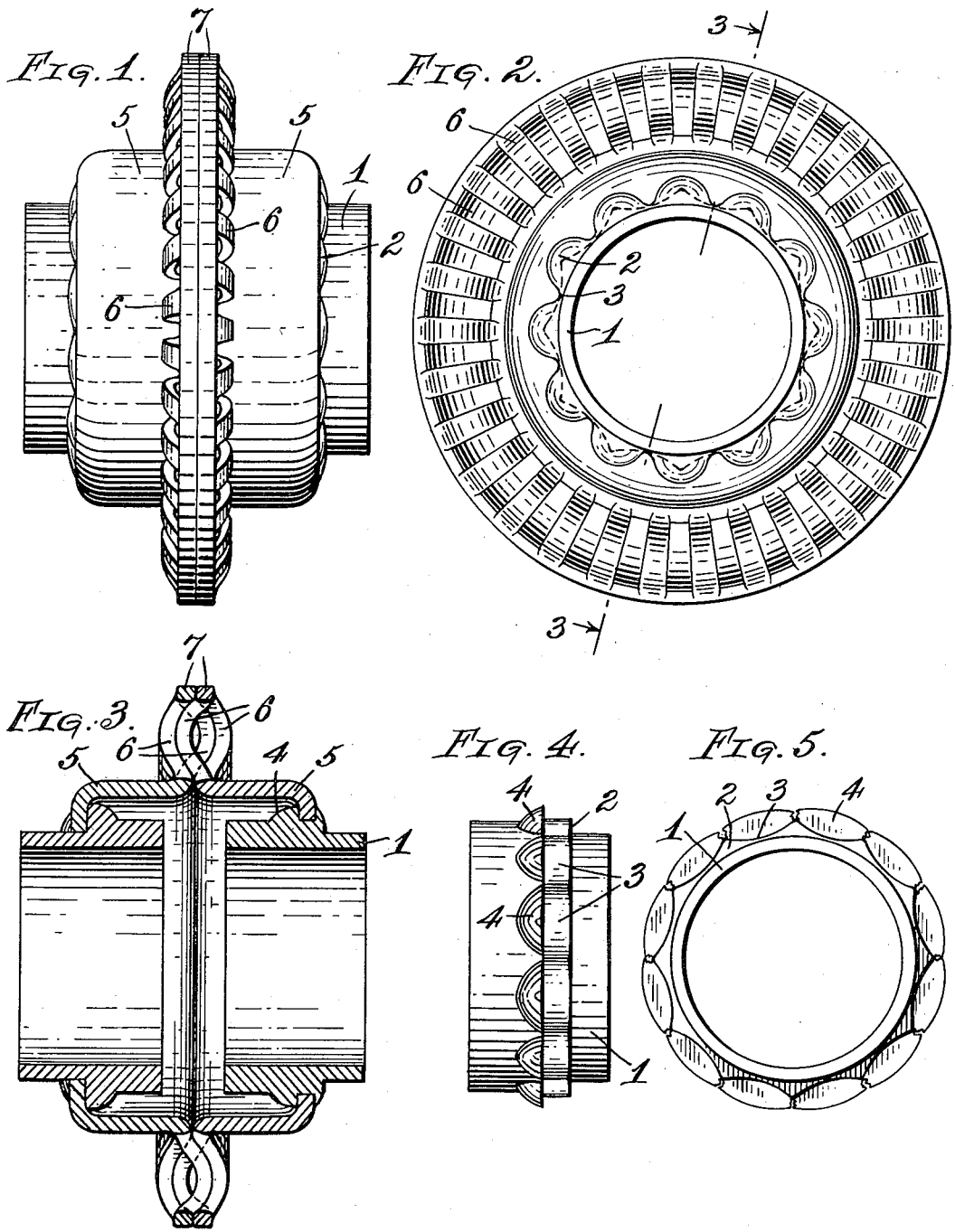

THEODORE J. SMULSKI, OF MILWAUKEE, WISCONSIN, ASSIGNOR TO GUSTAVUS A. SCHANZE, OF CLEVELAND, OHIO.

SHAFT-COUPLING.

1,245,813.   Specification of Letters Patent.   Patented Nov. 6, 1917.

Application filed December 3, 1915. Serial No. 64,930.

*To all whom it may concern:*

Be it known that I, THEODORE J. SMULSKI, citizen of the United States, residing at Milwaukee, in the county of Milwaukee and State of Wisconsin, have invented certain new and useful Improvements in Shaft-Couplings, of which the following is a specification.

This invention generally speaking relates to coupling devices and particularly to that type which are easily disconnected and which permit the shafts being out of axial alinement.

More specifically the invention relates to coupling devices comprising hub portions with stamped metal coöperating coupling plates secured thereto, and provided with a multiplicity of radially extending engaging edges adapted to form a driving connection between the two parts and arranged in a manner to permit the axes of the two members to be out of alinement.

The invention further relates to certain details of construction and combination of parts hereinafter set forth in the following description, drawings and claims.

Referring to the drawings, Figure 1 is an elevation looking at the periphery; Fig. 2 is a side elevation of the coupling; Fig. 3 is a sectional view upon the line 3—3 of Fig. 2; Fig. 4 is a view in elevation showing one of the hubs with the coupling member removed; and Fig. 5 is a top plan view of the device shown in Fig. 4.

In the embodiment shown in the drawings the two complete coupling units are identical, so that a description of one unit will suffice for both.

Each coupling unit comprises a hub 1 increased in diameter to form a shoulder 2, the metal of the hub being formed downward from the shoulder 2, to provide a plurality of symmetrically arranged arc shaped recesses 3 on the periphery. The working of the metal forms a plurality of ledges or faces 4 at the ends of these recesses for supporting the coupling member 5, which is punched out at the center to conform to the configuration of the recesses 3 of the hub, as is shown in Fig. 2. When this coupling member is in place on the hub the metal of the hub at the shoulder 2 is swaged over as shown in Figs. 2 and 3, to hold the coupling member in place. Each coupling member is preferably made of a stamping and near the periphery radially extending ribs 6 are punched in both directions from the plane of the member, so as to form a multiplicity of radially extending edge faces. These ribs extend laterally from the two sides of the coupling member so that the ribs of the two members may nest one into the other, thereby bringing about an engagement of the edges to form a driving coupling, which permits more or less misalinement of the axes of the two members. The ribs are preferably arranged within the outer periphery of each of the coupling members, so that a peripheral supporting ring 7, as it were, is provided for these ribs.

Having described my invention, I claim:—

1. A driving coupling, comprising a pair of coupling members having a plurality of outwardly extending teeth, the teeth of one member extending longitudinally into recesses in the other member and forming driving connections therebetween, and means connecting the outer ends of the teeth on each member.

2. A coupling member, comprising a central portion, radially disposed teeth extending longitudinally from said central portion, and a ring connecting the outer ends of said teeth.

3. A coupling member, comprising a central portion, radially disposed teeth extending longitudinally in both directions from said central portion, and a ring connecting the outer ends of said teeth.

4. A coupling member comprising a body portion, and teeth arranged in coaxial groups and extending laterally in opposite directions of the member.

5. A coupling member comprising a body portion, and a plurality of curved teeth having their edges extending radially with respect to the member, said teeth being arranged in coaxial groups of substantially the same diameter and extending in opposite directions in an alternate arrangement.

6. A coupling member comprising a central portion, a peripheral ring, and a plurality of teeth connecting the peripheral ring with the central portion and over-hanging the side thereof.

7. A coupling member comprising a central portion, a peripheral supporting ring, a plurality of radially disposed spaced ribs connecting the central portion with the peripheral ring and over-hanging one side of the member, and another set of radially disposed spaced ribs connecting the central portion with the peripheral ring and overhanging the opposite side, the teeth on the one side being opposed to the spaces between the teeth on the opposite side.

8. A coupling member made from sheet metal and comprising a central portion, a peripheral ring and radially disposed connecting teeth arranged in groups, one group curving outward from one face, and the other group curving outward from the opposite face, the metal of both sets of teeth being punched from the same piece of metal and alternating in arrangement.

In testimony whereof I affix my signature in presence of two witnesses as follows:

THEODORE J. SMULSKI.

Witnesses:
W. S. SMULSKI.
R. HILLER.